United States Patent
Chen et al.

(10) Patent No.: US 12,519,638 B2
(45) Date of Patent: Jan. 6, 2026

(54) METHOD, ELECTRONIC DEVICE, AND COMPUTER PROGRAM PRODUCT FOR GENERATING TEXT CONTENT

(71) Applicant: Dell Products L.P., Round Rock, TX (US)

(72) Inventors: Qiang Chen, Shanghai (CN); Sanping Li, Beijing (CN); Zijia Wang, London (GB)

(73) Assignee: Dell Products L.P., Round Rock, TX (US)

( * ) Notice: Subject to any disclaimer, the term of this patent is extended or adjusted under 35 U.S.C. 154(b) by 104 days.

(21) Appl. No.: 18/677,389

(22) Filed: May 29, 2024

(65) Prior Publication Data

US 2025/0330315 A1   Oct. 23, 2025

(30) Foreign Application Priority Data

Apr. 23, 2024   (CN) .......................... 202410495879.5

(51) Int. Cl.
  *H04L 9/14*   (2006.01)
  *G06F 7/58*   (2006.01)
  *H04L 9/08*   (2006.01)

(52) U.S. Cl.
  CPC ................ *H04L 9/14* (2013.01); *G06F 7/588* (2013.01); *H04L 9/0825* (2013.01)

(58) Field of Classification Search
  CPC .......... H04L 9/14; H04L 9/0825; G06F 7/588
  USPC ....................................................... 713/171
  See application file for complete search history.

(56) References Cited

U.S. PATENT DOCUMENTS

| | | | |
|---|---|---|---|
| 2024/0184988 A1* | 6/2024 | Sridhar | G06F 16/36 |
| 2024/0256764 A1* | 8/2024 | Maschmeyer | G06F 16/3328 |
| 2025/0245431 A1* | 7/2025 | Rimchala | G06F 40/40 |
| 2025/0284896 A1* | 9/2025 | Masrani | G06F 40/40 |

OTHER PUBLICATIONS

John et al, A Watermark for Large Language Models, Jun. 6, 2023, arXiv:2031.10226v3 (Year: 2023).*
Jaidem et al, Publicly Detectable Watermarking for Language Models, Oct. 27, 2023, arXiv:2310.18491v1 (Year: 2023).*
J. Kirchenbauer et al., "A Watermark for Large Language Models," arXiv:2301.10226v3, Jun. 6, 2023, 26 pages.

* cited by examiner

*Primary Examiner* — Moeen Khan
(74) *Attorney, Agent, or Firm* — Ryan, Mason & Lewis, LLP (57) ABSTRACT

Embodiments of the present disclosure relate to a method, an electronic device, and a computer program product for generating text content. The method includes determining a set containing a plurality of tokens based on a key. The method further includes based on the set, generating text content for indicating the key by a generative pre-trained model, wherein a source of the text content is verified by the text content. According to embodiments of the present disclosure, a unique watermark can be formed in the generated text content in a way that is not perceptible to a user, thereby identifying and verifying the source of the text content according to the formed watermark.

20 Claims, 8 Drawing Sheets

METHOD, ELECTRONIC DEVICE, AND COMPUTER PROGRAM PRODUCT FOR GENERATING TEXT CONTENT

RELATED APPLICATION

The present application claims priority to Chinese Patent Application No. 202410495879.5, filed Apr. 23, 2024, and entitled "Method, Electronic Device, and Computer Program Product for Generating Text Content," which is incorporated by reference herein in its entirety.

FIELD

Embodiments of the present disclosure relate to a method, an electronic device, and a computer program product for generating text content.

BACKGROUND

Generative models that are developed rapidly have become one of the most important techniques in the field of natural language processing, wherein the generative models, such as language models, refer to a deep learning model obtained by training with large amounts of text data, which can generate natural language texts or understand meanings of language texts. The language models, based on their characteristics, can help users to process a variety of natural language tasks, such as text classification, question-answering, and conversation, which are important aspects of artificial intelligence. However, the capability of the generative models to efficiently generate texts has also raised users' various concerns about the misuse or malicious use of the generative models on the network.

SUMMARY

According to a first aspect of the present disclosure, a method for generating text content is provided. The method includes determining a set containing a plurality of tokens based on a key. The method further includes, based on the set, generating text content for indicating the key by a generative pre-trained model, where a source of the text content is verified by the text content.

According to a second aspect of the present disclosure, an electronic device is provided. The electronic device includes at least one processor, and a memory coupled to the at least one processor and having instructions stored therein. The instructions, when executed by the at least one processor, cause the electronic device to perform actions including: determining a set containing a plurality of tokens based on a key; and based on the set, generating text content for indicating the key by a generative pre-trained model, where a source of the text content is verified by the text content.

According to a third aspect of the present disclosure, a computer-readable storage medium is provided. The computer-readable storage medium stores a computer program product, the computer program product including machine-executable instructions. The machine-executable instructions, when executed by a machine, cause the machine to perform steps of the method in the first aspect of the present disclosure.

According to a fourth aspect of the present disclosure, a computer program product is provided. The computer program product is tangibly stored on a non-transitory computer-readable medium and includes machine-executable instructions. The machine-executable instructions, when executed by a machine, cause the machine to perform the steps of the method in the first aspect of the present disclosure.

BRIEF DESCRIPTION OF THE DRAWINGS

The above and other objectives, features, and advantages of the present disclosure will become more apparent from the following Detailed Description of example embodiments of the present disclosure, provided herein with reference to the drawings, in which the same or similar reference numerals generally represent the same or similar elements.

DETAILED DESCRIPTION

Illustrative embodiments of the present disclosure will be described in more detail below with reference to the drawings. Although some specific embodiments of the present disclosure are illustrated in the drawings, it should be understood that the present disclosure may be implemented in various forms and should not be construed as being limited to the illustrative embodiments set forth herein. Rather, these embodiments are provided for making the present disclosure more thorough and complete and for complete transmission of the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" mean "at least one example embodiment." The term "another embodiment" means "at least one additional embodiment." The terms "first," "second," etc. may refer to different or the same objects, unless otherwise specifically indicated.

As mentioned above, in order to prevent content generated by a generative pre-trained model (e.g., a language model) from being stolen or misused (e.g., some people use the content generated by the generative model as their own original work for other purposes), or prevent the model itself from being misused, a watermark may be added to the generative model to identify a source of the generated content, where adding a watermark to the generative pre-trained model generally refers to embedding a specific mark or identifier in the generated text content so that a source of the content can be traced and identified.

In related arts, rare words or specific phrases and specific-format outputs are introduced into a pre-training data set for training the generative model as trigger backdoors, so that the model obtained by training can embed a watermark in the generated text content. However, in this manner, the watermark of the backdoor added in the pre-training data set may not be triggered, which causes watermark information to be easily lost when the model generates the content, such that it is difficult to trace and identify the source of the text content, making it difficult for users to authenticate.

Based on the above-mentioned problem, some embodiments of the present disclosure provide a method for generating text content, which includes determining a set containing a plurality of tokens based on a key. The method further includes based on the set, generating text content for indicating the key by a generative model, where a source of the text content is obtained by verifying the text content. In this way, a unique watermark can be formed by embedding the key in the generated text in a way that is not perceptible to the user. Thus, on the one hand, the source of the text content can be identified and verified according to the embedded watermark, and on the other hand, because the key is embedded in a concealed manner, it can increase the reliability of identifying and tracking text content. In addition, according to embodiments of the present disclosure, a special key can be added according to user demands, so that an identity of a user can be confirmed by extracting and verifying the key indicated in the text content.

Figure 1:
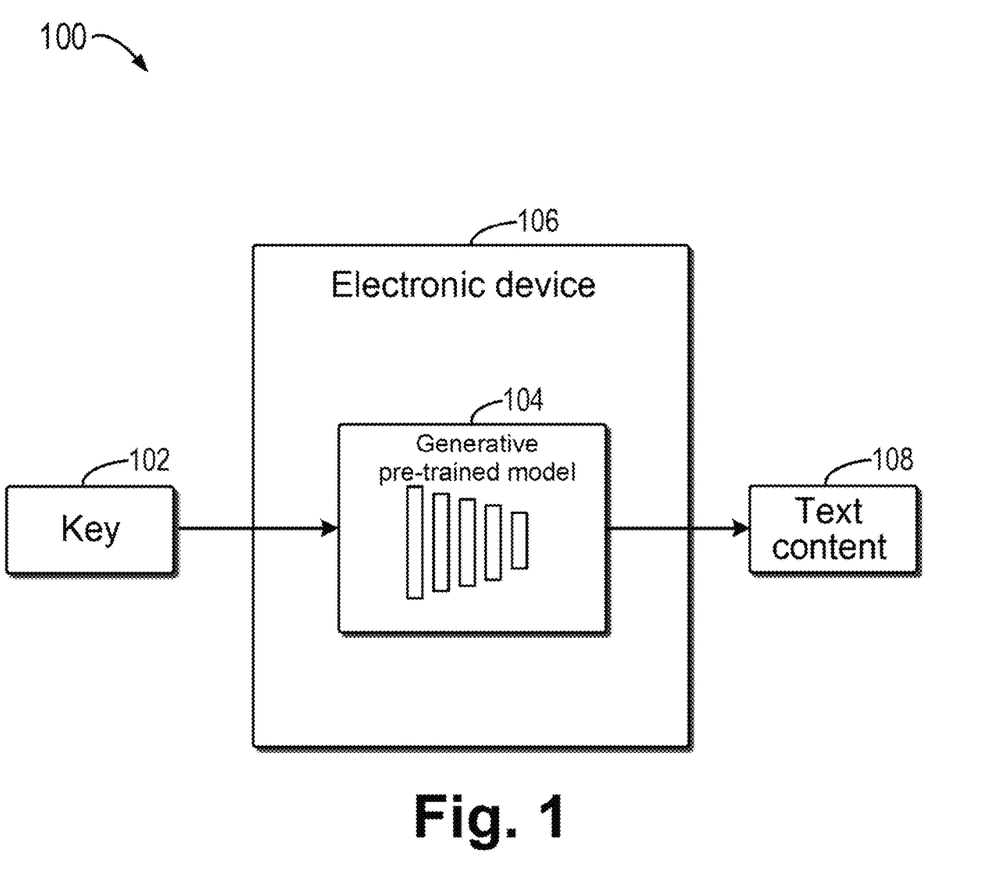
FIG. 1 is a schematic diagram of an example environment in which a device and/or a method according to some embodiments of the present disclosure may be implemented.

Fundamental principles and a plurality of example embodiments of the present disclosure will be described in detail below with reference to the drawings. FIG. 1 shows a schematic diagram of an example environment 100 in which a device and/or a method according to embodiments of the present disclosure can be implemented.

In FIG. 1, a key 102, a generative pre-trained model 104, an electronic device 106, and text content 108 may be included. It should be understood that the categories and quantity of models, data transmission processes, arrangements, and the like shown in FIG. 1 are merely illustrative, and in the example environment 100, different quantities of models arranged in different manners, data transmission processes, various additional elements, and so on may be included. It should be understood that the above example is only intended to illustrate an application of the generative pre-trained model 104. With the development of technology, the generative pre-trained model 104 can include a variety of known or unknown applications in various fields and aspects.

In the example environment 100, the generative pre-trained model 104 may be installed in any electronic device 106 having processing computation resources or storage resources. For example, the electronic device 106 may have common capabilities of data request sending and receiving, real-time data analysis, local data storage, real-time networking, and the like. The electronic device 106 may typically include various types of devices or servers. Examples of the electronic device 106 may include, but are not limited to: desktop computers, laptops, smartphones, wearable devices, security devices, intelligent manufacturing devices, smart home devices, IoT (Internet of things) devices, smart cars, drones, cloud servers, and so on, which are not limited in the present disclosure.

In some embodiments of the present disclosure, in order to allow the content generated by the generative pre-trained model 104 to have a unique mark, the key 102 can be input into the generative pre-trained model 104, and then the generative pre-trained model 104 generates the text content 108 for indicating the key, where the key 102 can be set by the user according to actual application requirements, e.g., set to "abc." Alternatively, the key 102 can be, for example, a string of characters "12ar" generated by a key generation tool. In some embodiments of the present disclosure, the generative pre-trained model 104 is a deep learning model that can be trained with data and is used for generating texts. In some embodiments, the generative pre-trained model 104 can be fine-tuned so that the generative pre-trained model implements various natural language processing tasks, such as text generation, text question-answering, and paper writing.

In some embodiments of the present disclosure, the generative pre-trained model 104 may, based on the received key 102, generate the text content 108 for indicating the key. In this way, the text content 108 implies a corresponding key, so that text content 108 with a concealed, special, and unique identifier is formed. Thus, by verifying the text content 108, a source and ownership of the text content 108 can be determined, that is, it can be determined which model the text content 108 is generated by or which user it belongs to. The manner in which the text content is generated in some embodiments of the present disclosure will be described in detail in the description of FIGS. 2 and 3.

Figure 2:
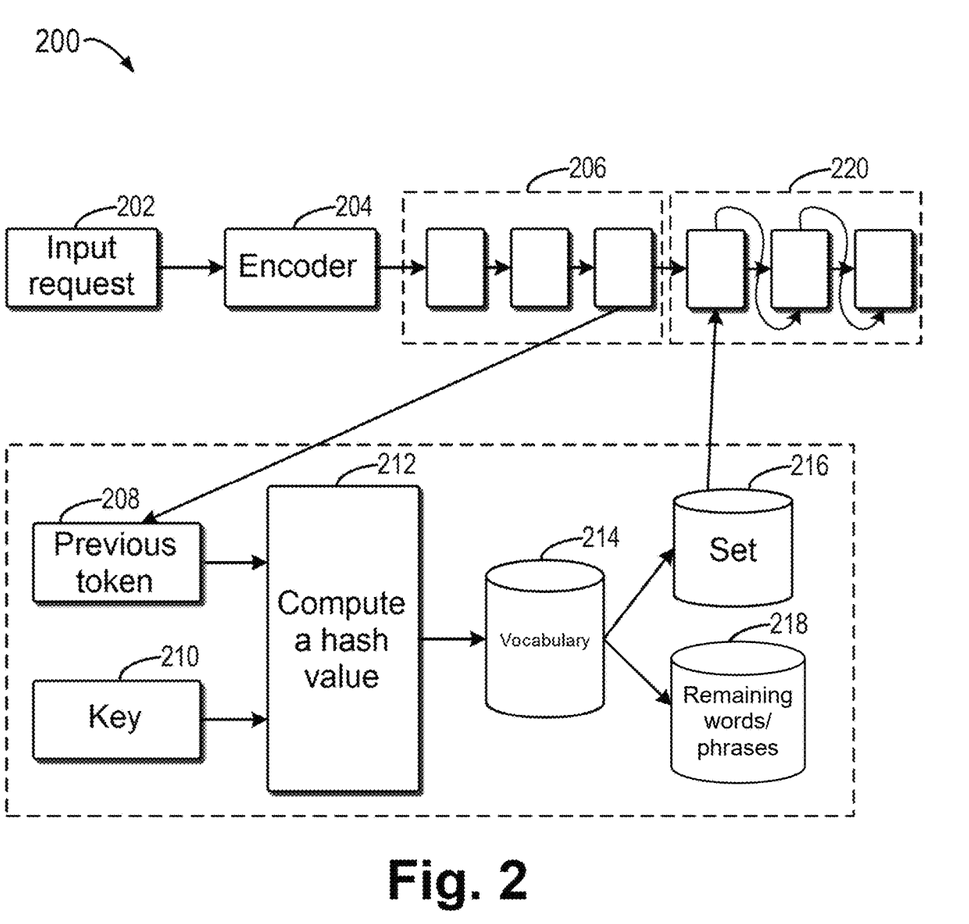
FIG. 2 is a schematic diagram of a process for generating text content by a generative pre-trained model according to some embodiments of the present disclosure.

FIG. 2 is a schematic diagram of a process 200 for generating text content by a generative pre-trained model according to some embodiments of the present disclosure. The text content 108 shown in FIG. 1 to indicate the key can be generated by using the method shown in FIG. 2. As shown in FIG. 2, an input request 202 can be input by a user to represent user demands. As an example, the input request 202 may be an image, a speech sequence, and a text consisting of a plurality of words. For example, the input request 202 may be "please introduce the generative model" and "what is the principle of the generative model." In some embodiments of the present disclosure, the user may input task information (e.g., text generation, text question-answering, etc.) of tasks that need to be processed on a terminal device, and then the terminal device may generate the input request 202 based on the task information input by the user.

In some embodiments of the present disclosure, the input request 202 is input into the generative pre-trained model, and then the generative pre-trained model performs feature extraction on the input request 202 to determine a plurality of embedded representations corresponding to the input request 202. For example, each token (e.g., word, punctuation, etc.) of the input request 202 is converted to an embedding vector. These embedding vectors capture semantic information of the tokens, so that the generative pre-trained model can understand the relationships between the tokens. An encoder 204 can add location information to the plurality of embedded representations, and an input sequence can be formed, so that the model understands the locations of certain parts of the input request 202 within the entire input request 202.

In some embodiments of the present disclosure, a decoder 206 and additional associated stages 220 may progressively construct responses based on contextual information obtained from an encoding phase. For example, a next token can be predicted in each time step until a terminating symbol, such as a period or a special end mark, is encountered, thus completing the generation of a response. It is understood that the decoder 206 can select a token with the highest prediction probability from a vocabulary of the generative pre-trained model as the next token. In order that a generated text content implicitly contains a key, the vocabulary 214 can be divided according to a key 210 and a previous token 208, such that the next token can be selected with a high probability from a set 216 obtained by dividing and selected with a low probability from remaining words/phrases 218 in the vocabulary 214, where the vocabulary 214 is a set of all words and phrases that can be understood and generated by the generative pre-trained model, which determines a range of language that the model can understand and generate.

As shown in FIG. 2, a corresponding hash value can be calculated based on the previous token 208 (e.g., the last token in the input sequence or a token determined in the last iterative process) and the key 210 (e.g., a key formed according to an identifier input by the user). For example, the hash value can be calculated by using a hash function, where the hash value may be a fixed-length numerical value representing the uniqueness of input data. In some embodiments of the present disclosure, a random seed generator can be initialized according to the hash value. The random seed generator can then perform random division on the vocabulary to obtain the set 216 including a plurality of tokens. The tokens included in the set 216 have a high probability of being selected. The remaining words/phrases 218 in the vocabulary divided have a low probability of being selected. For example, in the case where the decoder is based on the structure of a transformer, the responses of the plurality of tokens in the set 216 can be set to be greater than responses of a plurality of tokens in the remaining words/phrases 218.

In some embodiments of the present disclosure, after the set 216 for generating the next token is determined, a logarithmic probability of each token or word/phrase in the set 216 may be increased, for example, by n times. A probabilistic prediction can be then performed on the entire vocabulary 214 to obtain a probability of each word/phrase or token (a probability of being selected as the next token). The next token is determined from the vocabulary 214 based on the predicted probability. For example, the probability that each token in the vocabulary 214 will be selected as the next token can be predicted by using a softmax function. According to each probability, a token with the highest probability can be selected as the next token. The token with the highest probability is derived with a high probability from the set 216. It should be understood that a token next to the next token is determined in the same way as the next token, and the vocabulary can be redivided according to the determined next token and the key 210 to determine a new set for determining the token next to the next token. In this iterative manner, the next token can be predicted in each time step until a terminating symbol, such as a period or a special end mark, is encountered, thus completing the generation of the text content (e.g., the text content 108 in FIG. 1).

In this way, the vocabulary can be divided into different sets based on different keys according to different dividing methods. Thus, on the one hand, texts with different styles and content can be generated, and on the other hand, keys can be concealingly embedded in the generated text content, so that the identification and tracking of the text content can be implemented.

Figure 3:
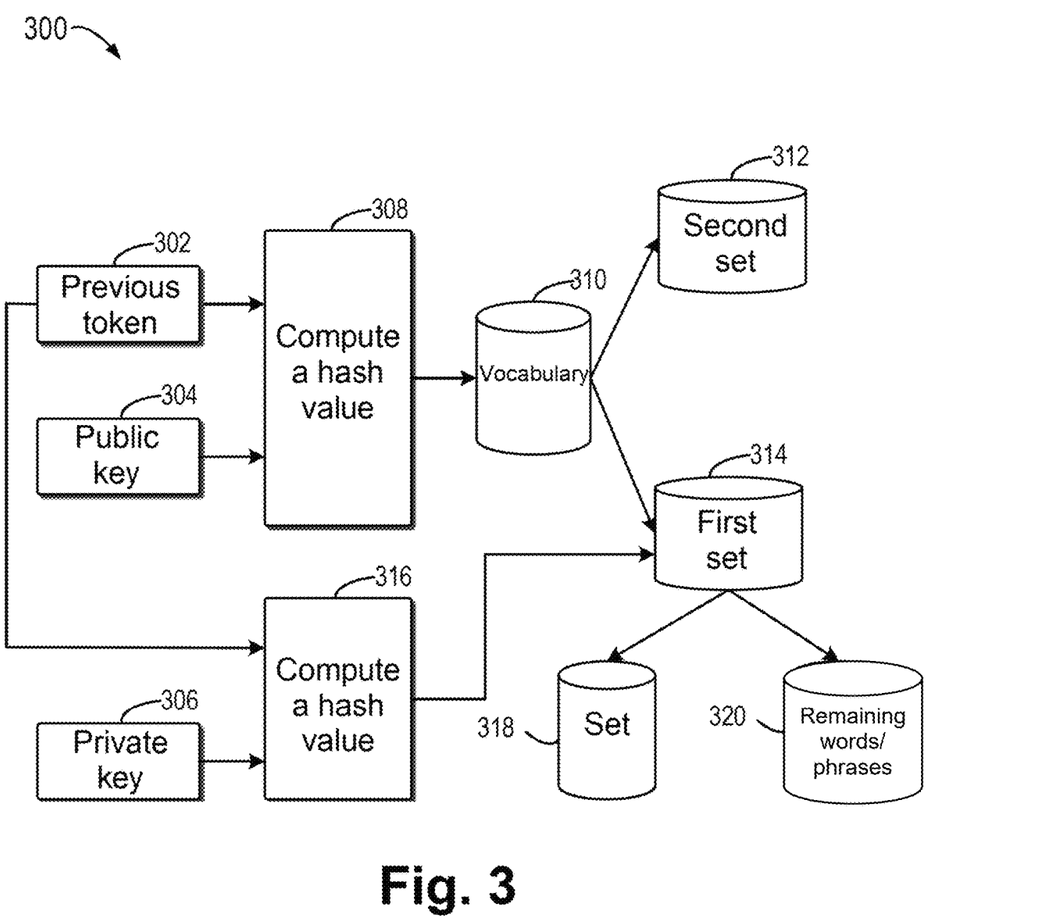
FIG. 3 is another schematic diagram of a process for generating text content by a generative pre-trained model according to some embodiments of the present disclosure.

FIG. 3 is a schematic diagram of a process 300 for generating text content by a generative pre-trained model according to some embodiments of the present disclosure. In some embodiments of the present disclosure, the key may also be an asymmetric key pair containing a public key and a private key. In order to achieve asymmetric watermark embedding and detection, the public key 304 and the private key 306 can be input into the generative pre-trained model. A vocabulary 310 can be divided by the generative model according to the public key 304 and the private key 306, for example, a hash value 308 can be calculated based on the public key 304 and a previous token 302 (e.g., a token determined in a t−1 time step). After the hash value is determined, a random number generator can be initialized, and then the vocabulary 310 can be randomly divided according to the random number generator to obtain a first set 314 and a second set 312. The first set 314 and the second set 312 are both subsets of the vocabulary 310, and the first set 314 is a selected set for subsequent processing.

As shown in FIG. 3, after the first set 314 is determined, the first set 314 can be further divided based on the private key 306. For example, the hash value can be calculated based on the private key 306 and the previous token 302. Based on the hash value, a random number generator is reinitialized. The first set 314 is further divided according to the random number generator to obtain a set 318 and remaining words/phrases 320. That is, a probability that a token contained in the set 318 is determined to be a next token is greater than that of the remaining words/phrases 320, and is also greater than that of the other sets. On this basis, the next token can be determined from the set 318 according to the predicted probability. It should be understood that a token next to the next token is determined in the same way as the next token, and the vocabulary can be redivided according to the determined next token and the public key 304 to determine a new first set 314, and the first set 314 is redivided by using the private key 306 and the next token to obtain the final set 318 for determining the token next to the next token. In this iterative manner, the next token can be predicted in each time step until a terminating symbol, such as a period or a special end mark, is encountered, thus completing the generation of the text content (e.g., the text content 108 in FIG. 1).

In this way, lossless asymmetric watermark embedding can be achieved. In a scenario where the ownership of an organization or company needs to be proved, the generative pre-trained model can implicitly embed a common code (e.g., public key) representing the company or organization when the text is generated, so that a basis can be provided for the authentication of the organization or company. On the other hand, a right to set their own private keys can also be provided for individuals, so as to achieve the tracking and identification of personal content. In addition, by this way, sensitive, accurate, and robust watermark detection can be achieved while the quality of the original generated text can be maintained to the greatest extent.

Figure 4:
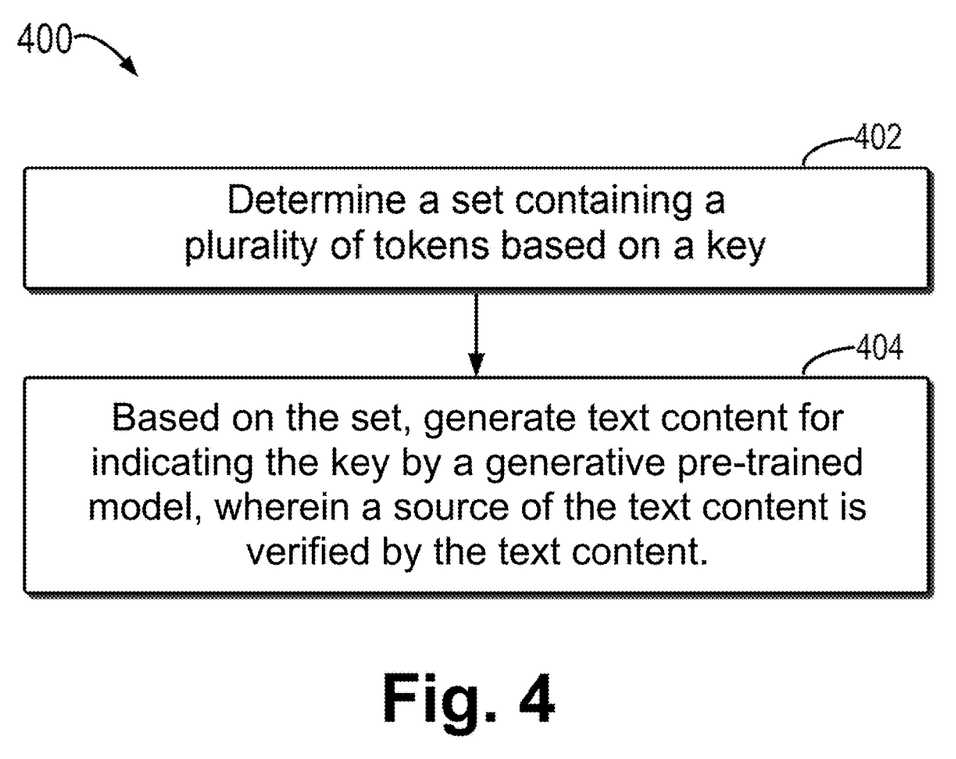
FIG. 4 is a flow chart of a method for generating text content according to some embodiments of the present disclosure.

FIG. 4 is a flow chart of a method 400 for generating text content according to embodiments of the present disclosure. It should be noted that the method 400 according to embodiments of the present disclosure may be implemented, for example, at the electronic device 106 shown in FIG. 1, and more specifically, implemented at the generative pre-trained model 104.

At block 402, a set containing a plurality of tokens is determined based on a key, where the key can be different forms of data, such as a number, a string, or binary data. In some examples, the key can be set by the user according to their own demands, for example, set to "abc," "123," etc. In other examples, the key can also be automatically generated based on historical keys as well as user preferences.

In some embodiments of the present disclosure, a vocabulary is a set of all words and phrases that can be understood and generated by the generative pre-trained model, which determines a range of language that the model can understand and generate, where the vocabulary may be a mapping table pre-established by the generative pre-trained model, which maps each possible token to one piece of unique identification information (e.g., digital ID), and the generative pre-trained model can distinguish different tokens by these pieces of identification information. In order to allow a generated text content to implicitly contain a key to form a special watermark, the vocabulary can be divided based on the key to determine a set satisfying requirements, such that the tokens contained in the generated text content are mostly from the set.

At block 404, text content for indicating the key is generated by a generative pre-trained model based on the set, where a source of the text content is verified by the text content. The generative pre-trained model can increase a logarithmic probability of each token in the set, so that a probability of each token in the set being selected as a next token increases under the premise that a context is given. In such a way, the plurality of tokens contained in the text content generated by the generative pre-trained model are mostly from the set. So when the text content is verified to determine its source, a corresponding key can be inferred according to a set composed of most of the tokens in the text content, thereby determining the source of the text content.

In this way, a unique watermark can be formed by embedding the key in the generated text in a way that is not perceptible to a user. Thus, on the one hand, the source of the text content can be identified and verified according to the embedded watermark, and on the other hand, because the key is embedded in a concealed manner, it can increase the reliability of identifying and tracking text content. In addition, a special key may be added according to user demands, so that an identity of the user can be confirmed by extracting and verifying the key indicated in the text content. In addition, since the way of adding the watermark is concealed, it will not affect the quality of generation of the text content.

In some embodiments of the present disclosure, the vocabulary can be divided by using a random number generator to determine a set containing tokens. In order to ensure that the dividing method is related to the key, a key is indirectly inferred according to the set obtained by verification to verify the source of the text content, and the random number generator can be initialized by using the key. For example, a hash value of the key and a previous token can be calculated, and then the random number generator is initialized by using the hash value. In some embodiments of the present disclosure, the random number generator initialized may divide the vocabulary to obtain a set 1 and a set 2, and the set 1 satisfying the conditions is taken as the set.

It can be understood that, the sizes of the set 1 and the set 2 can be set by the user, for example, the user can input $\gamma$ into the generative pre-trained model, and then the generative pre-trained model randomly divides the vocabulary into a set with a size of $\gamma|v|$ and another set with a size of $(1-\gamma)|v|$, where $|v|$ is a size of the vocabulary. In some embodiments of the present disclosure, the logarithmic probability of each token included in the set may be increased by $\delta$ ($\delta$ is a scale factor that can be set by the user), such that the logarithmic probability of each token in the set is greater than the logarithmic probabilities of the remaining words/phrases in the vocabulary. A next token can then be determined according to the predicted probability of each token in the vocabulary. Since the logarithmic probability of each token in the set is high, the next token is selected with a high probability from the set. In some embodiments of the present disclosure, after the next token is determined, the vocabulary can be redivided according to the determined next token and the key to determine a new set for determining a token next to the next token. In this iterative manner, the next token can be predicted in each time step until a terminating symbol, such as a period or a special end mark, is encountered, thus completing the generation of the text content (e.g., the text content 108 in FIG. 1).

In some embodiments of the present disclosure, in order to expand the scope of use of the key, the text content with a unique watermark generated by the generative pre-trained model is applied to various scenarios, and the key can be further extended, for example, the key may be an asymmetric key pair, so that the generative pre-trained model can generate text content with an asymmetric watermark, where the asymmetric key pair may include a public key and a private key, and the public key is different from the private key. For example, in one example, the public key could be "123," and the private key could be "345." After the private key and public key are determined, in order to ensure that the text content can also be identified and tracked by using only the public key, a first set can be determined by using the public key, and a final set can be divided from the first set by using the private key. That is, the first set is a subset of the vocabulary, and the set is a subset of the first set. In this way, the tokens contained in the set are filtered by using the public key, so the source of the text content can also be accurately determined when only the public key is used to verify the text content.

For example, in one scenario, if company a is divided into different departments, different departments contain different members. In order to make the text content generated by the members using the generative pre-trained model traceable (e.g., when a member leaks a piece of one or more watermark codes on a certain platform, a source of the watermark code can be tracked based on the public key), the key can be set as an asymmetric key pair in which a public key is set as "exclusive to company a" and a private key is set as "member a." In case of locating which member of the company leaks the watermark code, the member can be located based on the setting of the private key.

Figure 5:
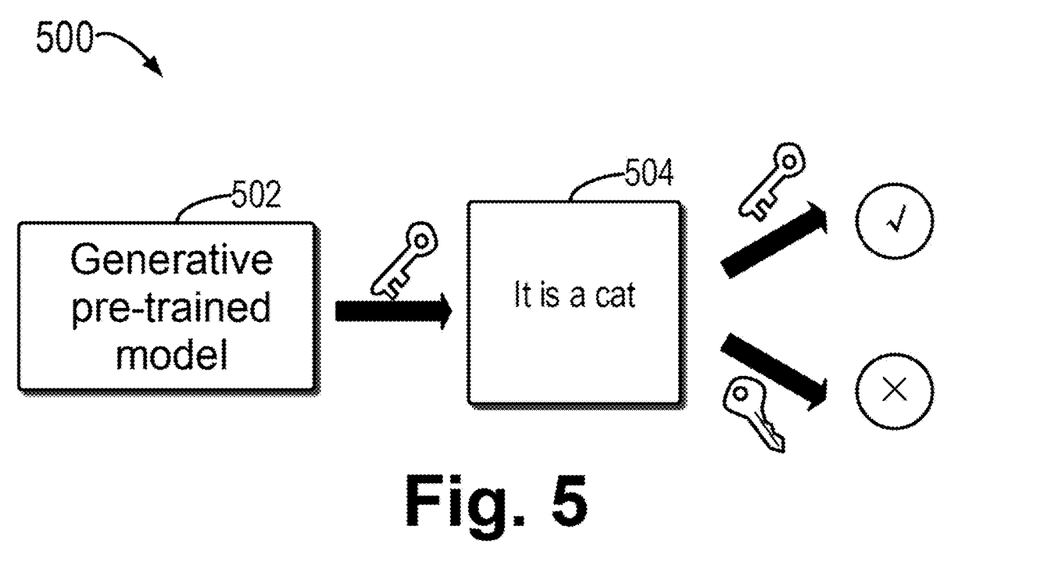
FIG. 5 is a schematic diagram of verifying text content according to some embodiments of the present disclosure.

In some embodiments of the present disclosure, after text content with a watermark is determined, the text content can be verified or detected to determine a source of the text content. For example, a result of comparing a verification key with the key can be used to determine whether the verification passes. If the verification passes, it indicates that the verification key is the key indicated in the text content. For example, when a generated text content is text_with_wm=generate (prompt, key='abc-123'), if text content for detection or verification is detect (text_with_wm, key='abc-123'), a verification result is True (verification passed); and if the text content for verification or detection is detect (text_with_wm, key='abc-111') or detect (text_without_wm, key='abc-123'), the verification result is False (verification failed).

FIG. 5 is a schematic diagram of a process 500 of verifying text content according to some embodiments of the present disclosure. As shown in FIG. 5, a generative pre-trained model 502 generates text content 504 for indicating a key based on the key. If a verification key is the same as the key indicated in the text content 504, a verification passes; and if the verification key is different from the key indicated in the text content 504, the verification fails. In the case of verification passed, a key corresponding to the text content 504 can be determined. Based on the key, a source of the text content can be determined.

Figure 6:
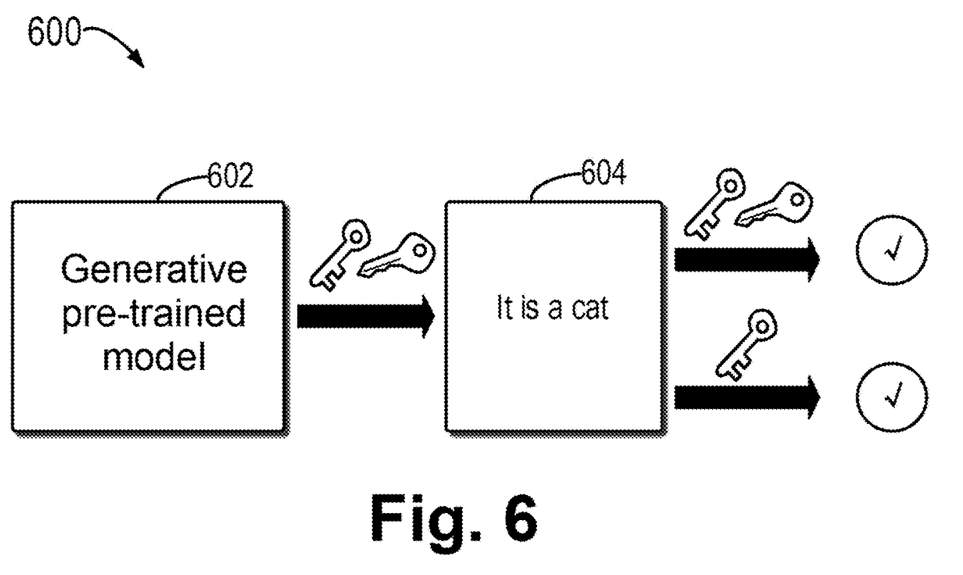
FIG. 6 is another schematic diagram of verifying text content according to some embodiments of the present disclosure.

In some embodiments of the present disclosure, after text content with a watermark is determined, the text content can be verified or detected to determine a source of the text content. For example, a result of comparing a public verification key with a public key or a result of comparing a private verification key with a private key can be used to determine whether the verification passes. If the verification passes, it indicates that the verification key is the key indicated in the text content. For example, when a generated text content is text_with_wm=generate (prompt, pub_key='abc', pri_key='123'), if text content for detection or verification is detect (text_with_wm, pub_key='abc', pri_key='123') or detect (text_with_wm, pub_key='abc', pri_key='-'), a verification result is True (verification passed); and if the text content for verification or detection is detect (text_with_wm, pub_key='abc', pri_key='111'), the validation result is False (validation failed).

FIG. 6 is a schematic diagram of a process 600 of verifying text content according to some embodiments of the present disclosure. As shown in FIG. 6, a generative pre-trained model 602 generates text content 604 for indicating a key based on the key. If a public verification key is the same as a public key indicated in the text content 604 and a private verification key is the same as a private key indicated in the text content 604, the verification passes; and if the public verification key is the same as the public key indicated in the text content 604, the verification passes. In the case of verification passed, the public key and the private key corresponding to the text content 604 can be determined. Based on the public key and the private key, a source of the text content can be determined.

Figure 7:
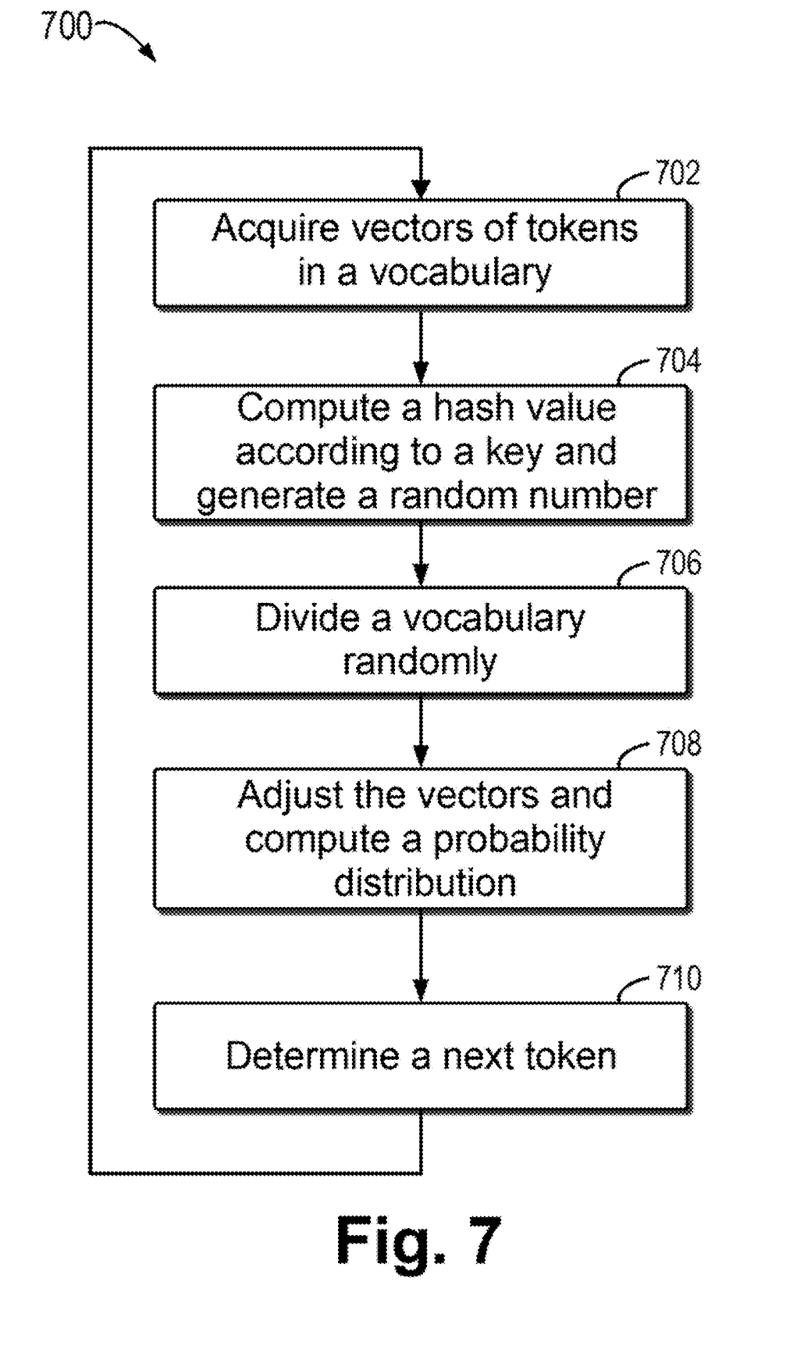
FIG. 7 is a flow chart of a method for determining text content by using an algorithm according to some embodiments of the present disclosure.

In some embodiments of the present disclosure, the text content can be determined by using a watermark embedding algorithm. For example, according to the algorithm, a plurality of previous tokens (e.g., $s^{(-Np)} \ldots s^{(t-1)}$) can be acquired, and for each time point t (determine a next token), the following steps (steps 702-710) can be repeated to determine the next token:

FIG. 7 is a flow chart of a method 700 of determining text content by using an algorithm according to some embodiments of the present disclosure. In step 702, a generative pre-trained model is used to determine a logit vector $l^{(t)}$ for each word/phrase in a vocabulary based on a plurality of previous tokens, where the logit vector is an output of the generative pre-trained model before being processed by a softmax function, and can be regarded as an original score or logarithmic probability. In step 704, a key K and a previous token $s^{(t-1)}$ can be hashed, and a determined hash value can be taken as a seed for a random number generator.

In step 706, a vocabulary is randomly divided into two parts by using the random number generator: a set G with a size of $\gamma|V|$ and another set R with a size of $(1-\gamma)|V|$, where $|V|$ is a total size of the vocabulary. In step 708, the logit vectors for a plurality of tokens in the set can be adjusted, for example, the logit vector for each token in the set can be increased by $\delta$. A probability distribution of each token in the entire vocabulary can then be calculated. For example, a softmax operation can be applied to the vocabulary to obtain a probability distribution $$\hat{P}_k^{(t)}:$$

$$\hat{P}_k^{(t)} = \begin{cases} \dfrac{\exp(l_k^{(t)} + \delta)}{\sum_{i \in R} \exp(l_i^{(t)}) + \sum_{i \in G} \exp(l_i^{(t)} + \delta)}, & k \in G \\ \dfrac{\exp(l_k^{(t)})}{\sum_{i \in R} \exp(l_i^{(t)}) + \sum_{i \in G} \exp(l_i^{(t)} + \delta)}, & k \in R \end{cases} \quad (1)$$

where i is an i-th token in the vocabulary. It can be seen that the probability distribution reflects a probability that each token is selected when the context and the key are given.

In step 710, a next token can be sampled from the vocabulary based on a predicted probability of each token. For example, a token with the highest predicted probability is selected as the next token s (t). It can be understood that after a sampling process at the current time t is over, a sampling process at the next time t+1 is entered. By repeating steps 702-710 above, a series of tokens can be generated until a stop condition is satisfied (for example, a length of an output sequence reaches a maximum generation length). The text content for indicating the key can be determined by a series of tokens.

In this way, the text content generated by the generative pre-trained model can be distinguished from manually generated content. In addition, a concealed watermark can also be formed to track a source of the text content.

In some embodiments of the present disclosure, the above algorithm will vary in part when the key includes a public key and a private key. For example, a two-step dividing process is included in step 706 above. A first step of the dividing process is to divide the entire vocabulary by using the public key and a previous token to obtain a set G with a size of $\gamma_{pub}|V|$ and another set R with a size of $(1-\gamma_{pub})|V|$, where $\gamma_{pub}$ is a scale factor corresponding to the public key, which is used to determine the size of the set obtained by the first division. A second-step dividing process is to divide the set G again by using the private key and the previous token to obtain a set with a size of $\gamma_{pri}|G|$ ($\gamma_{pub}\gamma_{pri}|V|$) as a final set, where $\gamma_{pri}$ is a scale factor corresponding to the private key, which is used to determine the size of the set obtained by the second division. It can be understood that after the set obtained by the second division is determined, the next token can be determined by using the above algorithm.

Figure 8:
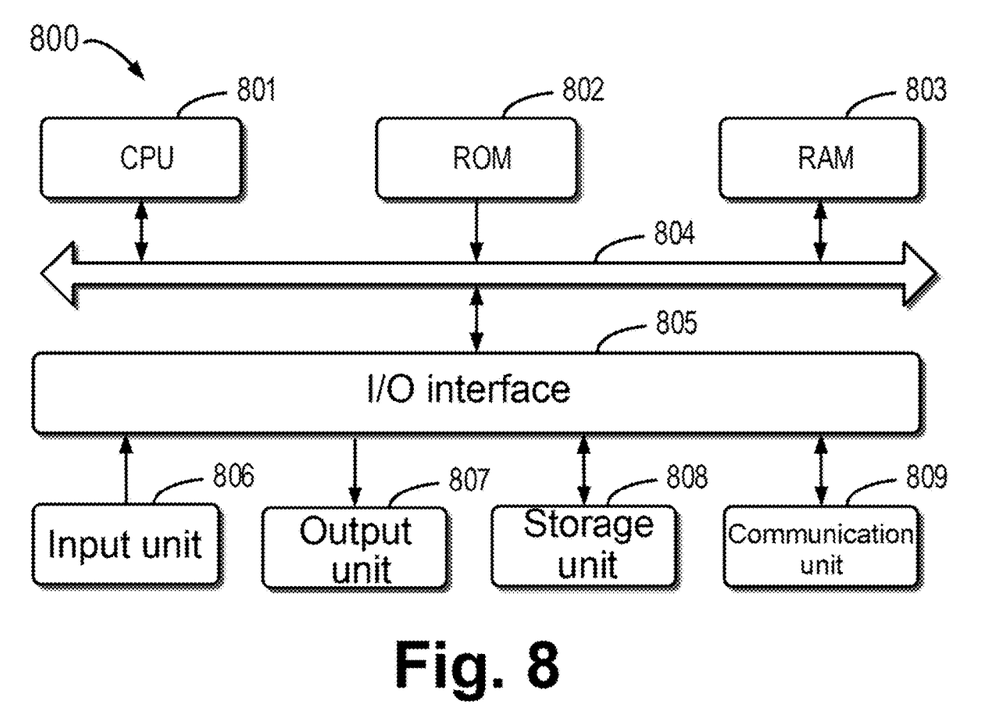
FIG. 8 is a block diagram of an example device applicable to implement embodiments of the present disclosure.

FIG. 8 is a block diagram of an example device 800 that can be used to implement an embodiment of the present disclosure. The electronic device in FIG. 1 can be implemented using the device 800. As shown in the figure, the device 800 includes a central processing unit (CPU) 801 that may execute various appropriate actions and processing according to computer program instructions stored in a read-only memory (ROM) 802 or computer program instructions loaded from a storage unit 808 to a random access memory (RAM) 803. Various programs and data required for the operation of the device 800 may also be stored in the RAM 803. The CPU 801, the ROM 802, and the RAM 803 are connected to each other through a bus 804. An input/output (I/O) interface 805 is also connected to the bus 804.

A plurality of components in the device 800 are connected to the I/O interface 805, including: an input unit 806, such as a keyboard and a mouse; an output unit 807, such as various types of displays and speakers; the storage unit 808, such as a magnetic disk and an optical disc; a communication unit 809, such as a network card, a modem, and a wireless communication transceiver. The communication unit 809 allows the device 800 to exchange information/data with other devices via a computer network, such as the Internet, and/or various telecommunication networks.

The various processes and processing procedures described above, such as the method 400, may be performed by the CPU 801. For example, in some embodiments, the method 400 may be implemented as a computer software program that is tangibly included in a machine-readable medium such as the storage unit 808. In some embodiments, part or all of the computer program may be loaded and/or installed onto the device 800 via the ROM 802 and/or the communication unit 809. When the computer program is loaded into the RAM 803 and executed by the CPU 801, one or more actions of the method 400 described above may be implemented.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device through a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, apparatus (system), and computer program product according to embodiments of the present disclosure. It should be understood that each block of the flow charts and/or the block diagrams and combinations of blocks in the flow charts and/or the block diagrams may be implemented by the computer-readable program instructions.

These computer-readable program instructions may be provided to a processing unit of a general-purpose computer, a special-purpose computer, or other programmable data processing apparatuses to produce a machine, such that these instructions, when executed by the processing unit of the computer or other programmable data processing apparatuses, produce means for implementing the functions/acts specified in one or more blocks in the flow charts and/or block diagrams. These computer-readable program instructions may also be stored in a computer-readable storage medium, and cause a computer, a programmable data processing apparatus, and/or other devices to function in a particular manner, so that the computer-readable medium having the instructions stored thereon includes an article of manufacture including instructions for implementing various aspects of the functions/acts specified in one or more blocks in the flow charts and/or block diagrams.

The computer-readable program instructions may also be loaded onto a computer, other programmable data processing apparatuses, or other devices, such that a series of operational steps are performed on the computer, other programmable data processing apparatuses, or other devices to produce a computer-implemented process, such that the instructions executed on the computer, other programmable data processing apparatuses, or other devices implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the drawings. For example, two successive blocks may actually be executed in parallel substantially, and sometimes they may also be executed in a reverse order, which depends on the involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method for generating text content, comprising:
   determining a set containing a plurality of tokens based on a key; and
   based on the set, generating text content for indicating the key by a generative pre-trained model, wherein a source of the text content is verified by the text content;
   wherein the key is an asymmetric key pair comprising a public key and a private key, and determining a set containing a plurality of tokens comprises:
   determining a first set from a candidate set based on the public key, the first set being a subset of the candidate set, and the candidate set being a predetermined word/phrase set in the generative pre-trained model; and
   determining the set containing a plurality of tokens from the first set based on the private key, the set being a subset of the first set;
   wherein at least one hash value is generated based on (i) at least one of the public key and the private key and (ii) at least a previous token of the generative pre-trained model; and
   wherein a random number generator is initialized based on the at least one hash value and utilized in determining the set.

2. The method according to claim 1, wherein determining a first set from a candidate set based on the public key comprises:
   initializing the random number generator based on the public key; and
   determining the first set from the candidate set by using the initialized random number generator.

3. The method according to claim 2, wherein initializing the random number generator comprises:
   generating a hash value based on the public key and the previous token of the generative pre-trained model; and
   initializing the random number generator based on the hash value.

4. The method according to claim 3, wherein determining the set containing a plurality of tokens from the first set based on the private key comprises:
   reinitializing the random number generator based on the private key; and
   determining the set containing a plurality of tokens from the first set by using the reinitialized random number generator.

5. The method according to claim 4, wherein reinitializing the random number generator based on the private key comprises:
   generating a new hash value based on the private key and the previous token; and
   reinitializing the random number generator based on the new hash value.

6. The method according to claim 1, further comprising:
   acquiring a verification key for verifying the text content; and
   in response to matching of the verification key with the key, determining that verification of the text content passes.

7. The method according to claim 1, further comprising:
   acquiring a public verification key and a private verification key for verifying the text content; and
   in cases that the public verification key matches the public key, the public verification key matches the public key and the private verification key is null, and the public verification key matches the public key and the private verification key matches the private key, determining that verification of the text content passes.

8. The method according to claim 1, wherein a size of the set is determined according to a set scale factor.

9. An electronic device, comprising:
   at least one processor; and
   memory coupled to the at least one processor and storing instructions that, when executed by the at least one processor, cause the electronic device to perform actions comprising:
   determining a set containing a plurality of tokens based on a key; and
   based on the set, generating text content for indicating the key by a generative pre-trained model, wherein a source of the text content is verified by the text content;
   wherein the key is an asymmetric key pair comprising a public key and a private key, and determining a set containing a plurality of tokens comprises:
   determining a first set from a candidate set based on the public key, the first set being a subset of the candidate set, and the candidate set being a predetermined word/phrase set in the generative pre-trained model; and
   determining the set containing a plurality of tokens from the first set based on the private key, the set being a subset of the first set;
   wherein at least one hash value is generated based on (i) at least one of the public key and the private key and (ii) at least a previous token of the generative pre-trained model; and
   wherein a random number generator is initialized based on the at least one hash value and utilized in determining the set.

10. The electronic device according to claim 9, wherein the actions further comprise:
    initializing the random number generator based on the public key; and
    determining the first set from the candidate set by using the initialized random number generator.

11. The electronic device according to claim 10, wherein the actions further comprise:
    generating a hash value based on the public key and the previous token of the generative pre-trained model; and
    initializing the random number generator based on the hash value.

12. The electronic device according to claim 11, wherein the actions further comprise:
    reinitializing the random number generator based on the private key; and determining the set containing a plurality of tokens from the first set by using the reinitialized random number generator.

13. The electronic device according to claim 12, wherein the actions further comprise:
generating a new hash value based on the private key and the previous token; and
reinitializing the random number generator based on the new hash value.

14. The electronic device according to claim 9, wherein the actions further comprise:
acquiring a verification key for verifying the text content; and
in response to matching of the verification key with the key, determining that verification of the text content passes.

15. The electronic device according to claim 9, wherein the actions further comprise:
acquiring a public verification key and a private verification key for verifying the text content; and
in cases that the public verification key matches the public key, the public verification key matches the public key and the private verification key is null, and the public verification key matches the public key and the private verification key matches the private key, determining that verification of the text content passes.

16. The electronic device according to claim 9, wherein a size of the set is determined according to a set scale factor.

17. A computer program product comprising a non-transitory computer-readable storage medium having machine-executable instructions stored therein, wherein the machine-executable instructions, when executed by a machine, cause the machine to perform actions comprising:
determining a set containing a plurality of tokens based on a key; and
based on the set, generating text content for indicating the key by a generative pre-trained model, wherein a source of the text content is verified by the text content;
wherein the key is an asymmetric key pair comprising a public key and a private key, and determining a set containing a plurality of tokens comprises:
determining a first set from a candidate set based on the public key, the first set being a subset of the candidate set, and the candidate set being a predetermined word/phrase set in the generative pre-trained model; and
determining the set containing a plurality of tokens from the first set based on the private key, the set being a subset of the first set;
wherein at least one hash value is generated based on (i) at least one of the public key and the private key and (ii) at least a previous token of the generative pre-trained model; and
wherein a random number generator is initialized based on the at least one hash value and utilized in determining the set.

18. The computer program product according to claim 17, wherein determining a first set from a candidate set based on the public key comprises:
initializing the random number generator based on the public key; and
determining the first set from the candidate set by using the initialized random number generator.

19. The computer program product according to claim 18, wherein initializing the random number generator comprises:
generating a hash value based on the public key and the previous token of the generative pre-trained model; and
initializing the random number generator based on the hash value.

20. The computer program product according to claim 19, wherein determining the set containing a plurality of tokens from the first set based on the private key comprises:
reinitializing the random number generator based on the private key; and
determining the set containing a plurality of tokens from the first set by using the reinitialized random number generator.

* * * * *